July 5, 1960 R. E. COX ET AL 2,943,688
REVERSIBLE PLOW AND GAUGE WHEELS
Filed Sept. 22, 1958 2 Sheets-Sheet 2

INVENTORS.
ROBERT E. COX
JAMES F. SULLIVAN
BY

ATTORNEYS

2,943,688

REVERSIBLE PLOW AND GAUGE WHEELS

Robert E. Cox, Moline, and James F. Sullivan, East Moline, Ill., assignors to Deere & Company, Moline, Ill., a corporation of Delaware Filed Sept. 22, 1958, Ser. No. 762,566

11 Claims. (Cl. 172—212)

The present invention relates generally to agricultural implements and more particularly to tractor mounted plows of the two way or reversible type, wherein right hand plowing or left hand plowing may be performed as desired.

The object and general nature of this invention is the provision of new and improved gauging means for a plow of this type, wherein a pair of gauge wheels are carried by the plow and reversed when the plow is reversed, one or the other of the gauge wheels moving automatically into proper operating position whenever the plow is reversed. Another feature of this invention is the provision of new and improved means for adjusting the operating position of the gauge wheels, and still further, an additional feature of this invention is a provision of means for insuring, that, when adjusted for deep plowing, the idle gauge wheel will not interfere with the proper operation of the gauge wheel in gauging position.

These and other objects and advantages of the present invention will be apparent to those skilled in the art after a consideration of the following detailed description, taken in conjunction with the accompanying drawings, in which.

Figure 1:
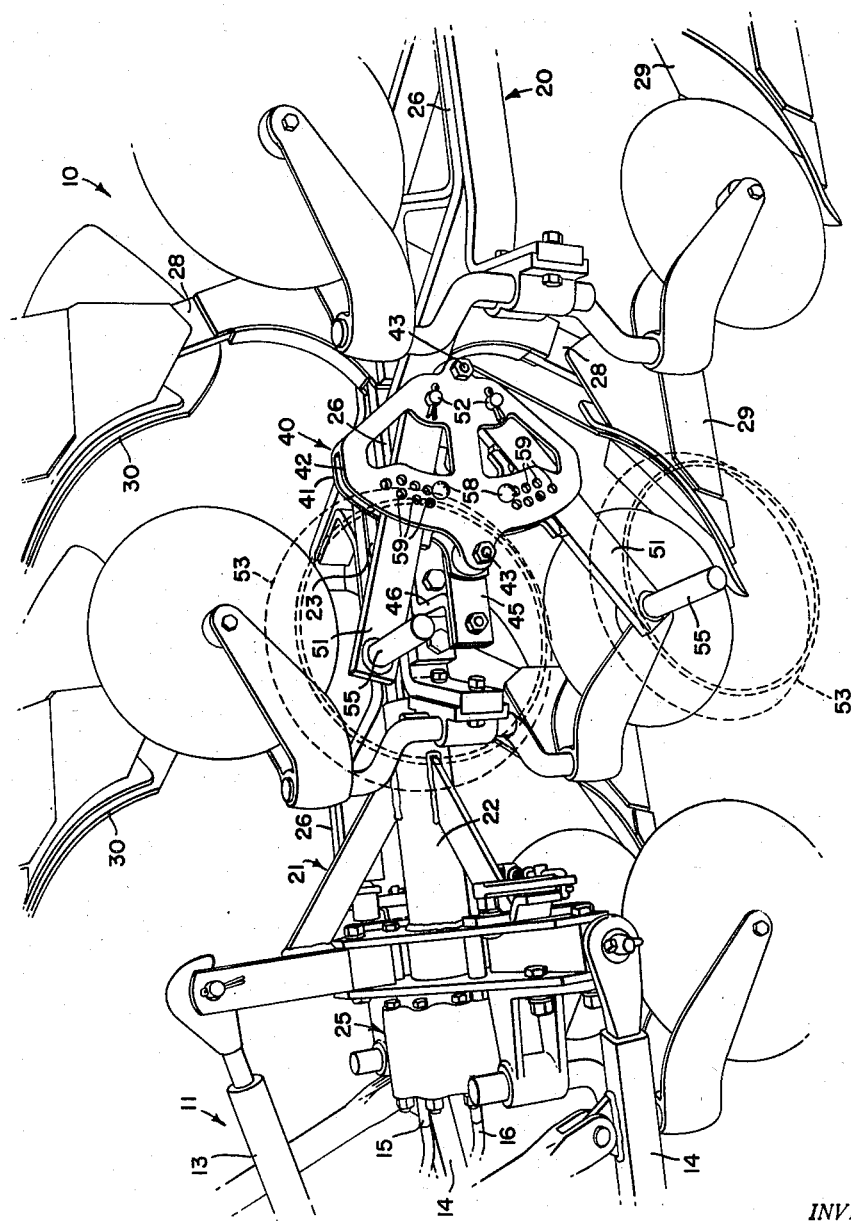
Fig. 1 is a fragmentary perspective view illustrating a multi-bottom two-way moldboard plow in which the principles of the present invention have been incorporated, the plow being shown in position for right hand plowing, the plow being shown in its raised or transport position.

Referring first to Fig. 1, for the purposes of illustrating the principles of our invention we have chosen to show the same as embodied in a two way plow 10 that is adapted to be connected to a farm tractor 11 having a power lift system of the type that includes power actuated means to raise and lower the upper and lower hitch links 13 and 14 of the three point hitch linkage with which the tractor 11 is equipped. Also, the tractor power lift means includes an independently controlled remote cylinder actuating means to which a pair of hydraulic conduits 15 and 16 are connected. The tractor itself, as well as the hydraulic power lift system just described, is conventional so far as the principles of the present invention are concerned, and these parts have therefore not been illustrated in full detail. Also, so far as this invention is concerned, the principal details of the plow 10 are conventional, the plow 10 being shown as a multi-bottom moldboard plow that comprises a plow frame 20 reversibly mounted for rocking movement about a generally fore-and-aft extending axis in a hitch frame structure 21, the latter including a generally fore-and-aft extending sleeve 22 within which a fore-and-aft extending beam 23, which forms the main part of the plow frame, is rotatably mounted, the beam extending forwardly of the hitch frame structure 21 to a position to be operated by a hydraulic motor 25 carried at the forward side of the hitch frame structure and receiving power from the hydraulic connections 15 and 16. The plow frame 20 also includes a plurality of beams 26, some disposed at one side of the axis of the main beam 23 and some disposed at the other side, thereof. The main beam 23 carries conventional standards 28 to which plow bottoms 29 and 30 are connected, one set of plow bottoms 29 being constructed for right hand plowing while the other plow bottoms 30 are constructed for left hand plowing.

According to this invention, new and improved gauge wheel means, especially constructed for two-way plows, is provided, the parts being arranged so as to secure ample trash clearance at all depths of plowing. The gauge wheel means of the present invention comprises a bracket 40 fixed to the forward portion of the plow frame 20. The bracket 40 preferably is in the form of a casting that includes a pair of vertical sections 41 and 42 that are fixed, as by bolts 43, to one side of a fore-and-aft extending support bar 45 that is bolted to the laterally outer ends of a frame bar 46. The bar 46 is bolted to the side of the plow beam 23 generally in front of the diagonal beam portion 26 that extends rearwardly to the rear bottom.

Figure 2:
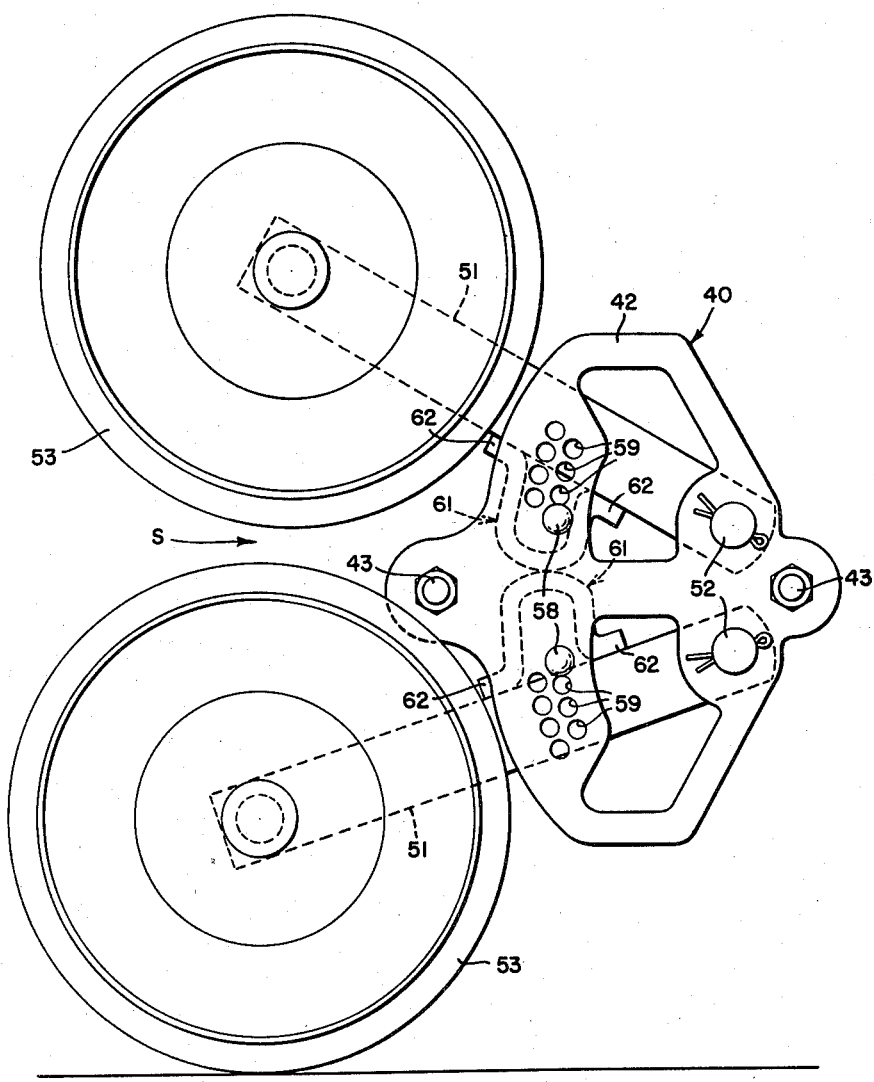
Fig. 2 is an enlarged fragmentary elevation showing the position of the gauge wheel when the plow is in one of the deep plowing positions.

The bracket 40 receives a pair of swingably mounted gauge wheel arms 51 therebetween. Each gauge wheel arm 51 is mounted on a pin 52 carried by the rear portion of the bracket 40. The arms 51 extend generally forwardly and at the outer or forward end of each gauge wheel arm 51 there is a gauge wheel 53 that is mounted on an associated stub axle 55. The gauge wheel arms 51 are freely swingable within limits between the bracket sections 41 and 42, and, as shown in Fig. 2, when the plow is in one of its working positions, the lowermost gauge wheel 53 swings upwardly under the influence of the weight of the plow until the upper edge of the associated gauge wheel arm 51 comes into contact with a stop pin 58 which is disposable in any registering pair of a plurality of pairs of openings 59. Thus, the deeper the plowing desired, the nearer the pins 58 will be disposed toward the center of the bracket 40. Fig. 2 shows the pins 58 in the holes 59 for the deepest plowing.

Each gauge wheel arm 51 carries a loop type abutment 61 that preferably is formed of bar stock brought to generally U-shaped configuration with end sections 62 secured, as by welding, to the adjacent portions of the gauge wheel arm 51. The associated pin 58 extends through the loop portion of the abutment 61 so that, when the plow is raised into its transport position, as shown in Fig. 1, the downward swinging of the lowermost gauge wheel and gauge wheel arm is limited by the associated pin 58. The downward movement of the upper gauge wheel and gauge wheel arm in the transport position is limited by engagement of the edge of the associated arm 51 with the associated pin 58, as shown in Fig. 1.

When the plow is lowered into operating position as shown in Fig. 2, and the plow bottoms move into the ground toward their working position, the lowermost gauge wheel and gauge wheel arm swing upwardly until the upper edge of the lower arm 51 engages the associated stop pin 58. This determines the depth of operation of the plow. As will be seen from Fig. 2, when the pins 58 are in the openings 59 close to the center of the bracket 40, which is in position for fairly deep plowing, the abutment member 61 on the upper bar 51 comes into engagement with the abutment 61 on the lower bar 51. This maintains a space S (Fig. 2) between the wheels 53 when plowing, whereby the uppermost gauge wheel is held out of engagement with the operating or lower gauge wheel. Thus, the idle or inactive gauge wheel is presented from interfering with the proper action of the lower or operating gauge wheel. In the arrangement of the gauge wheel arms for more shallow plowing, where the pins 58 are disposed in selected openings spaced farther away from the center of the bracket than is illustrated in Fig. 1, the arm 51 of the idle gauge wheel comes against the associated stop pin 58 which holds the idle gauge wheel out of contact with the working gauge wheel.

While we have shown and described above the preferred structure with which the principles of the present invention have been incorporated, it is to be understood that our invention is not to be limited to the particular details, shown and described above, but that, in fact, widely different means may be employed in the practice of the broader aspects of our invention.

What we claim, therefore and desired to secure by Letters Patent is:

1. In a tractor mounted two-way plow, a plow frame adapted to be raised, reversed and lowered, a pair of gauge wheels carried by said frame and reversed when said frame is reversed, a pair of arms separately pivoted to said plow frame and carrying said gauge wheels, said arms lying in a common plane, and stop means acting between said arms to prevent one gauge wheel from coming into engagement with the other, said stop means comprising a pair of mutually engageable abutments, one fixed to the adjacent edge of each arm.

2. In a tractor mounted two-way plow, a plow frame adapted to be raised, reversed and lowered, a pair of gauge wheel arms pivoted at spaced apart points on said frame and both arms extending at an angle relative to one another generally in a fore-and-aft direction away from said points, gauge wheels journaled on the outer end portions of said arms, respectively, and limit stops on said frame engageable, respectively, with said arms for limiting movement thereof to determine the depth of plowing.

3. The invention set forth in claim 2, further characterized by said arms extending generally forwardly from said pivot points and said gauge wheels being disposed adjacent the forward portion of said frame.

4. In a tractor mounted two-way plow, a plow frame adapted to be raised, reversed and lowered, a pair of gauge wheel arms pivoted at spaced apart points on said frame adjacent the forward portion thereof, both arms extending at an angle relative to one another generally in a fore-and-aft direction forwardly away from said points, gauge wheels journaled on the forward end portions of said arms, respectively, and limit stops on said frame engageable, respectively, with said arms for limiting movement thereof to determine the depth of plowing.

5. In a tractor mounted two-way plow, a plow frame adapted to be raised, reversed and lowered, bracket means fixed to said frame and including parallel spaced apart sections, a pair of coplanar gauge wheel arms pivoted to said bracket means and individually swingable between said spaced apart sections, stop means disposed between said spaced apart bracket sections and cooperating with the portions of said gauge wheel arms lying between said sections for limiting the approach of said arms toward one another, and gauge wheels journaled on said arms.

6. In a tractor mounted two-way plow, a plow frame adapted to be raised, reversed and lowered, bracket means fixed to said frame and including parallel spaced apart sections, a pair of coplanar gauge wheel arms pivoted to said bracket means and individually swingable between said spaced apart sections, and a pair of individually adjustable stops carried by said spaced apart sections in positions to limit the approach of said arms toward one another, and gauge wheels journaled on said arms.

7. In a tractor mounted two-way plow, a plow frame adapted to be raised, reversed and lowered, bracket means fixed to said frame and including parallel spaced apart sections extending generally perpendicular to the general plane of said frame and projecting substantially equal distances at opposite sides of said plane, a pair of coplanar gauge wheel arms pivoted to said bracket means at spaced apart points and individually swingable between said spaced apart sections, stop pins carried in selected positions by said spaced apart bracket sections and engageable with the adjacent edges of said arms, respectively, and a gauge wheel journaled on the outer end of each arm.

8. The invention set forth in claim 7, further characterized by an abutment on each wheel arm extending toward the other wheel arm for also limiting the approach of said arms toward one another in certain positions of said stop pins.

9. In a tractor mounted two-way plow, a plow frame adapted to be raised, reversed and lowered, a pair of gauge wheels carried by said frame and reversed when said frame is reversed, a pair of arms separately pivoted to said plow frame and carrying said gauge wheels, and a stop abutment on each arm and extending toward the adjacent portion of the other arm, said abutments being of substantially equal length and the length of each being such that when the abutments are in contact the gauge wheels are held out of contact with one another.

10. In a tractor mounted two-way plow, a plow frame adapted to be raised, reversed and lowered, a pair of gauge wheel arms pivoted at spaced apart points on said frame and both arms extending at an angle relative to one another generally in a fore-and-aft direction away from said points, gauge wheels journaled on the outer end portions of said arms, respectively, stop pins adjustably carried by said frame, one for each arm, and said stop pins being engageable, respectively, with said arms for limiting movement, of the lower gauge wheel upwardly toward the frame so as to determine the depth of plowing, and abutment means carried by each arm and engageable with the associated stop pin whereby outward movement of each gauge wheel arm relative to the frame is limited during reversal of the plow and the lower gauge wheel approaches but is still out of engagement with the ground.

11. The invention set forth in claim 10, further characterized by said abutment means including a part embracing the associated stop pin, whereby the abutment means on said gauge wheel arms acts to prevent one gauge wheel from contacting the other gauge wheel when one is disposed in an operating position and the other is in an idle position.

References Cited in the file of this patent

UNITED STATES PATENTS 2,777,373    Pursche _____ Jan. 15, 1957

FOREIGN PATENTS 183,255    Austria _____ Sept. 26, 1955
646,665    France _____ July 17, 1928